US012656265B2

(12) United States Patent
Weber et al.

(10) Patent No.: US 12,656,265 B2
(45) Date of Patent: Jun. 16, 2026

(54) SEMI-SPHERICAL CALIBRATION OBJECTS FOR INSPECTION CAMERA ASSEMBLY

(71) Applicant: UnitX, Inc., Santa Clara, CA (US)

(72) Inventors: Killian Weber, Redwood City, CA (US); Kyle Patrick Brocklehurst, Redwood City, CA (US); Martin Invaldsen, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 114 days.

(21) Appl. No.: 18/818,580

(22) Filed: Aug. 28, 2024

(65) Prior Publication Data

US 2026/0063560 A1 Mar. 5, 2026

(51) Int. Cl.
*G01N 21/88* (2006.01)

(52) U.S. Cl.
CPC ..... *G01N 21/8806* (2013.01); *G01N 21/8851* (2013.01); *G01N 2201/0636* (2013.01); *G01N 2201/12723* (2013.01); *G01N 2201/12746* (2013.01)

(58) Field of Classification Search
CPC ........... G01N 21/8806; G01N 21/8851; G01N 2201/0636; G01N 2201/12723; G01N 2201/12746
See application file for complete search history.

(56) References Cited

U.S. PATENT DOCUMENTS

| | | | |
|---|---|---|---|
| 2009/0079987 A1* | 3/2009 | Ben-Ezra | G01N 21/474 356/445 |
| 2011/0262007 A1* | 10/2011 | Kojima | G06T 7/586 382/103 |
| 2016/0054221 A1* | 2/2016 | Wilcken | G01N 21/55 356/446 |

* cited by examiner

*Primary Examiner* — Dominic J Bologna
(74) *Attorney, Agent, or Firm* — Schwegman Lundberg & Woessner, P.A.

(57) ABSTRACT

In an example embodiment, rather than a single calibration object, a plurality of calibration objects are placed within the field of view of an inspection camera at the same time. Each of the calibration objects is or includes a semi-spherical reflective object having known sizes. During a calibration process, the distance between a light source and camera may be determined by activating the light source and capturing an image of how the light source bounces off each of the calibration objects, and more particularly the location on each of the calibration objects that the light source appears to reflect from. This allows the angle that the light source strikes each calibration object to be calculated, and these angles can then be used to determine the distance between the light source and the camera.

20 Claims, 11 Drawing Sheets

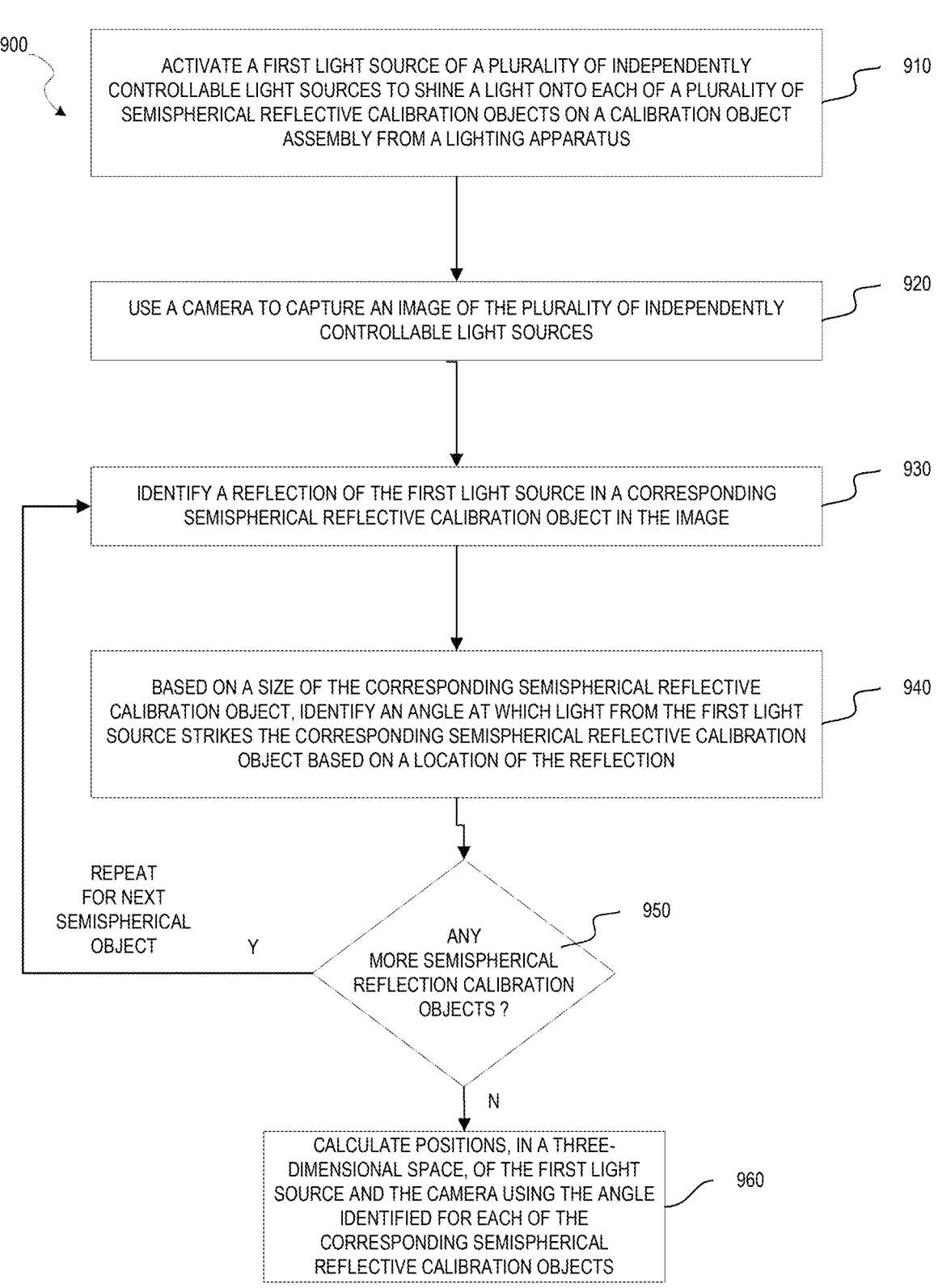

900

910

ACTIVATE A FIRST LIGHT SOURCE OF A PLURALITY OF INDEPENDENTLY CONTROLLABLE LIGHT SOURCES TO SHINE A LIGHT ONTO EACH OF A PLURALITY OF SEMISPHERICAL REFLECTIVE CALIBRATION OBJECTS ON A CALIBRATION OBJECT ASSEMBLY FROM A LIGHTING APPARATUS

920

USE A CAMERA TO CAPTURE AN IMAGE OF THE PLURALITY OF INDEPENDENTLY CONTROLLABLE LIGHT SOURCES

930

IDENTIFY A REFLECTION OF THE FIRST LIGHT SOURCE IN A CORRESPONDING SEMISPHERICAL REFLECTIVE CALIBRATION OBJECT IN THE IMAGE

940

BASED ON A SIZE OF THE CORRESPONDING SEMISPHERICAL REFLECTIVE CALIBRATION OBJECT, IDENTIFY AN ANGLE AT WHICH LIGHT FROM THE FIRST LIGHT SOURCE STRIKES THE CORRESPONDING SEMISPHERICAL REFLECTIVE CALIBRATION OBJECT BASED ON A LOCATION OF THE REFLECTION

REPEAT FOR NEXT SEMISPHERICAL OBJECT        Y

950

ANY MORE SEMISPHERICAL REFLECTION CALIBRATION OBJECTS ?

N

960

CALCULATE POSITIONS, IN A THREE-DIMENSIONAL SPACE, OF THE FIRST LIGHT SOURCE AND THE CAMERA USING THE ANGLE IDENTIFIED FOR EACH OF THE CORRESPONDING SEMISPHERICAL REFLECTIVE CALIBRATION OBJECTS

*FIG. 9*

SEMI-SPHERICAL CALIBRATION OBJECTS FOR INSPECTION CAMERA ASSEMBLY

TECHNICAL FIELD

This application relates generally to inspection camera assemblies. More particularly, this application relates to semi-spherical calibration objects for an inspection camera assembly.

BACKGROUND

Inspection cameras are used in industrial products to aid in detecting defects in manufactured products. For example, if a manufacturer is producing metal castings, one or more inspection cameras may be placed in a manufacturing and/or assembly line to inspect the produced metal castings, or portions thereof, to detect any issues with quality control. However, when capturing images, a particular light source may not be conducive for imaging a product having a particular surface, a particular defect, and/or a particular environment. For example, surface materials or characteristics on products that affect light quality of a captured image include reflective qualities, transparent qualities, or black/ opaque qualities. In another example, some types of defects may be difficult to detect, such as scratches or dirt. In another example, in some environments product defects are more challenging to detect.

An inspection camera may be improved by improving the design of a lighting apparatus to increase light in various scenarios. More particularly, rather than a single light source, which provides inadequate light for capturing an image with quality sufficient to ascertain the existence of surface defects on all surface materials on various components or products, a lighting apparatus having multiple light sources may be provided. Furthermore, a controller for the lighting apparatus may be provided that allows for the multiple light sources to be independently controlled, allowing for lighting combinations and sequences to be utilized to maximize the flexibility of the lighting apparatus to provide sufficient light for a number of different products, components, materials, and environments.

In such environments, a camera is used to capture images of the manufactured products. This camera, however, may be positioned separately from the light sources themselves. For example, the camera may be located on a separately positionable apparatus from the lighting apparatus.

An issue that arises is that in order to properly analyze images of manufactured products the relative 3D position(s) between the camera and any lights used to light the manufactured products must be known. Determining the relative 3D position(s) may be performed during a calibration process, using a calibration object which is placed in the field of view of the camera while one or more light sources are activated.

BRIEF DESCRIPTION OF DRAWINGS

FIG. 9 is a flowchart of an example method for calibrating an inspection system in accordance with an example embodiment.

DETAILED DESCRIPTION

In an example embodiment, rather than a single calibration object, a plurality of calibration objects are placed within the field of view of an inspection camera at the same time. Each of the calibration objects is or includes a semi-spherical reflective object having known sizes. During a calibration process, the relative 3D position between a light source and a camera may be determined by activating the light source and capturing an image of how the light source bounces off each of the calibration objects, and more particularly the location on each of the calibration objects that the light source appears to reflect from. This allows the angle that the light source strikes each calibration object to be calculated, and these angles can then be used to determine the 3D position of the light source relative to the camera.

Figure 1:
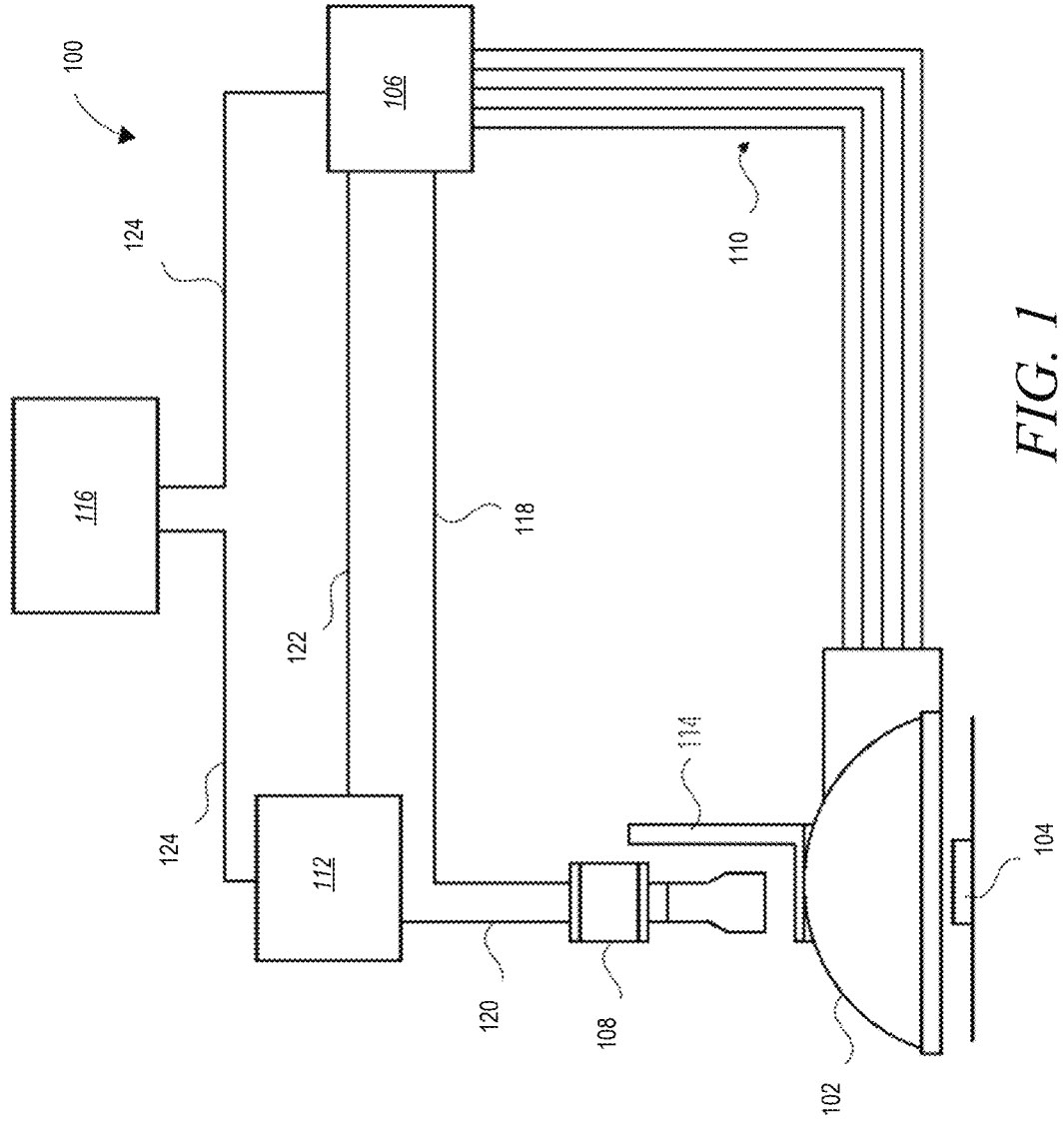
FIG. 1 illustrates a block diagram of an inspection system according to some examples.

FIG. 1 illustrates a block diagram of an inspection system 100 according to some examples. The inspection system 100 includes a light dome 102, a camera 108, a controller 106, an industrial computer 112, and a factory computer 116. The factory computer 116 is in communication with controller 106 and the computer 112 via a wired or wireless factory network 124.

The light dome 102 in use illuminates a target object 104, such as a metal casting or other product. The light dome 102 includes a housing containing a number of light sources as will be described in more detail below. In some examples, the light sources comprise a plurality of LEDs or display screens arranged to provide flexibility in illuminating the target object 104. The light sources are selectively activated by the controller 106 using power cables 110. A light source is a unit of lighting that is individually addressable by the controller 106 to illuminate the target object 104. An individual light source may thus comprise a single LED or a number of LEDs that are addressable as a group. A light source may also comprise a subset of a light generating unit, such as a group or block of pixels in a flexible display screen. Preferably the light dome 102 includes at least ten individually addressable light sources arranged within the light dome 102, to provide lighting flexibility.

The camera 108, which may be mounted to the light dome 102 by a bracket 114, captures images of the illuminated target object 104 through a hole in the top of the light dome 102. The camera 108 is triggered by the controller 106 via a trigger line 118, synchronized to the actuation of the light sources in light dome 102.

The controller 106 controls operation of the camera 108 and illumination of the target object 104 by the light dome 102. The controller 106 receives instructions from the computer 112 via a control line 122. The controller 106 may be implemented by a hardware processor disposed in the camera 108. The controller 106 may further include hardware components that may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

The controller 106 illuminates the target object according to one or more optimal lighting configurations. The lighting configurations may be defined as a matrix, where each value of the lighting configuration matrix represents a working status of each independently controllable light source, such as one or more LEDs and/or groups of pixels on a flexible display screen. The matrix may also include brightness or color values for particular configurations. The lighting configurations may also be arranged into a configuration sequence, which specifies an order of lighting configurations to be executed for a particular target object 104, such that a number of images under different lighting conditions are captured by the camera 108

The computer 112 runs software that provides a user interface that can be used to specify lighting configurations and sequences, which can be loaded into the controller 106. The computer 112 also instructs operation of the controller 106 via the control line 122, and receives images captured by the camera 108 via a data line 120.

The factory computer 116 provides overall factory control, and can receive operational data and captured images from the controller 106 and the computer 112 via the factory network 124. The factory computer 116 can also provide instructions to control or initiate operation of the inspection system 100, based for example on other factory operations such as the movement of target objects 104 past the light dome 102.

Figure 2:
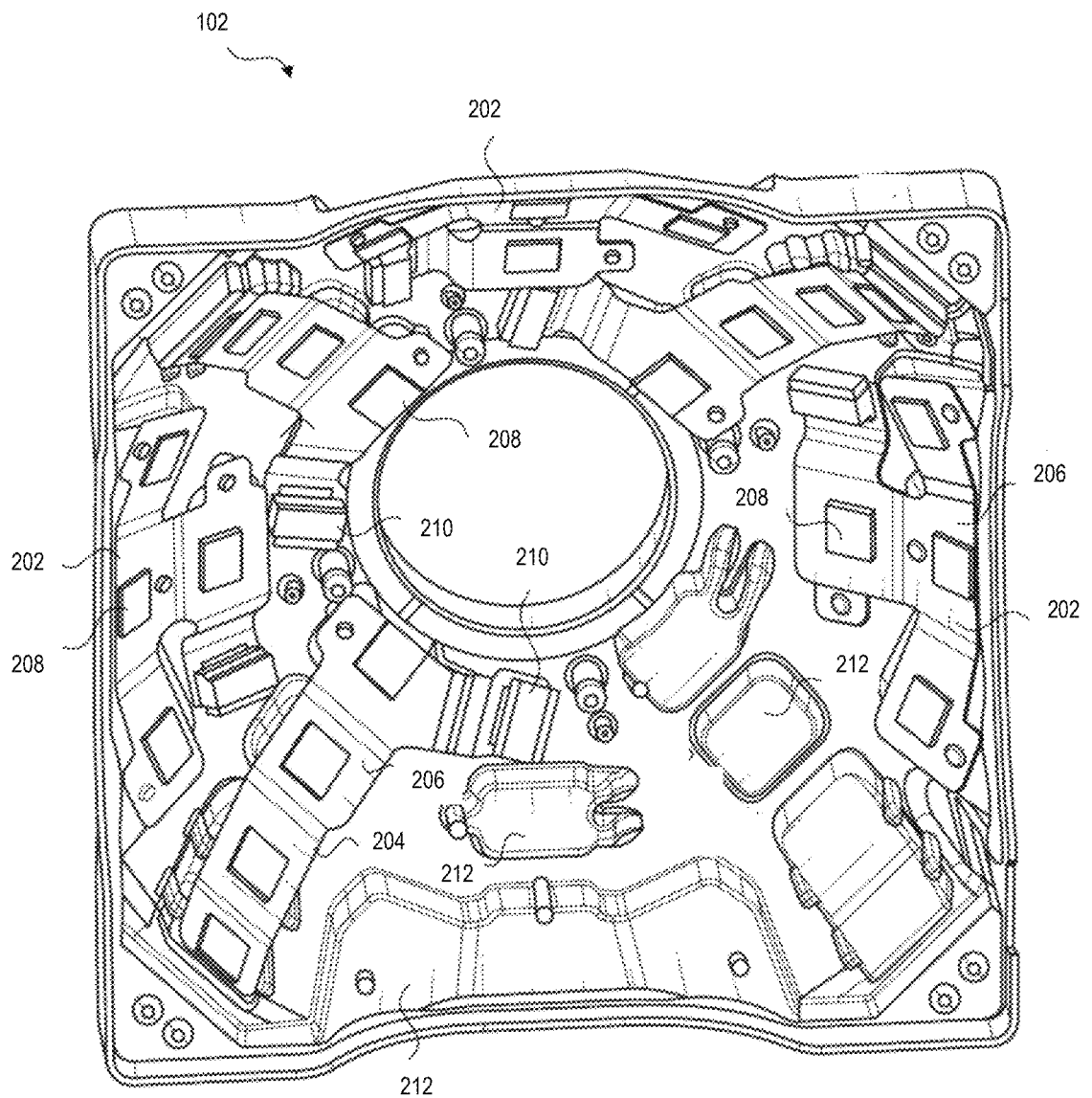
FIG. 2 illustrates a perspective view of the underside of the light dome of FIG. 1, showing the positioning of PCBs including light sources, such as LEDs, according to some examples.

FIG. 2 illustrates a perspective view of the underside of the light dome 102 of FIG. 1, showing the positioning of PCBs including light sources, such as LEDs, according to some examples. In this view, some of the PCBs have been removed to show the detail of the underside of the outer cover in addition to the positioning of the LEDs.

The underside of the light dome 102 is generally hemispherical in shape, and includes four T-shaped PCBs 202 and four L-shaped PCBs 204 according to some examples. In this view, the L-shaped PCB 204 on the lower left side is not shown, and the T-shaped PCB 202 on the left side is not shown.

Each PCB includes a substrate 206, a connector 210 and a number of high-powered LEDs 208 for providing selective illumination of the target object 104 under control of the controller 106. As can be seen from the figure, the underside of the outer cover includes a number of islands or pads 212, which define raised surfaces on the underside of the outer cover for supporting each of the T-shaped PCBs 202 and the L-shaped PCBs 204. The locations of the pads 212 correspond to the locations of the LEDs 208, and thermal paste is provided between each pad 212 and the LEDs 208 to facilitate heat transfer from the LEDs to the light dome 102.

While not pictured, a camera may be located in the center of the light dome 102. Notably, this camera may not be physically attached to the light dome 102 and thus there is a question of the distances between the camera and the LEDs 208 on the light dome 102. In addition to variance in distances in the x- and y-axes, there could also be variance along the z-axis as well since it is possible that the light dome 102 may not be oriented completely parallel to the ground (or base at which the camera is pointed), and thus some of the LEDs 208 could actually be oriented higher than others.

Figure 3:
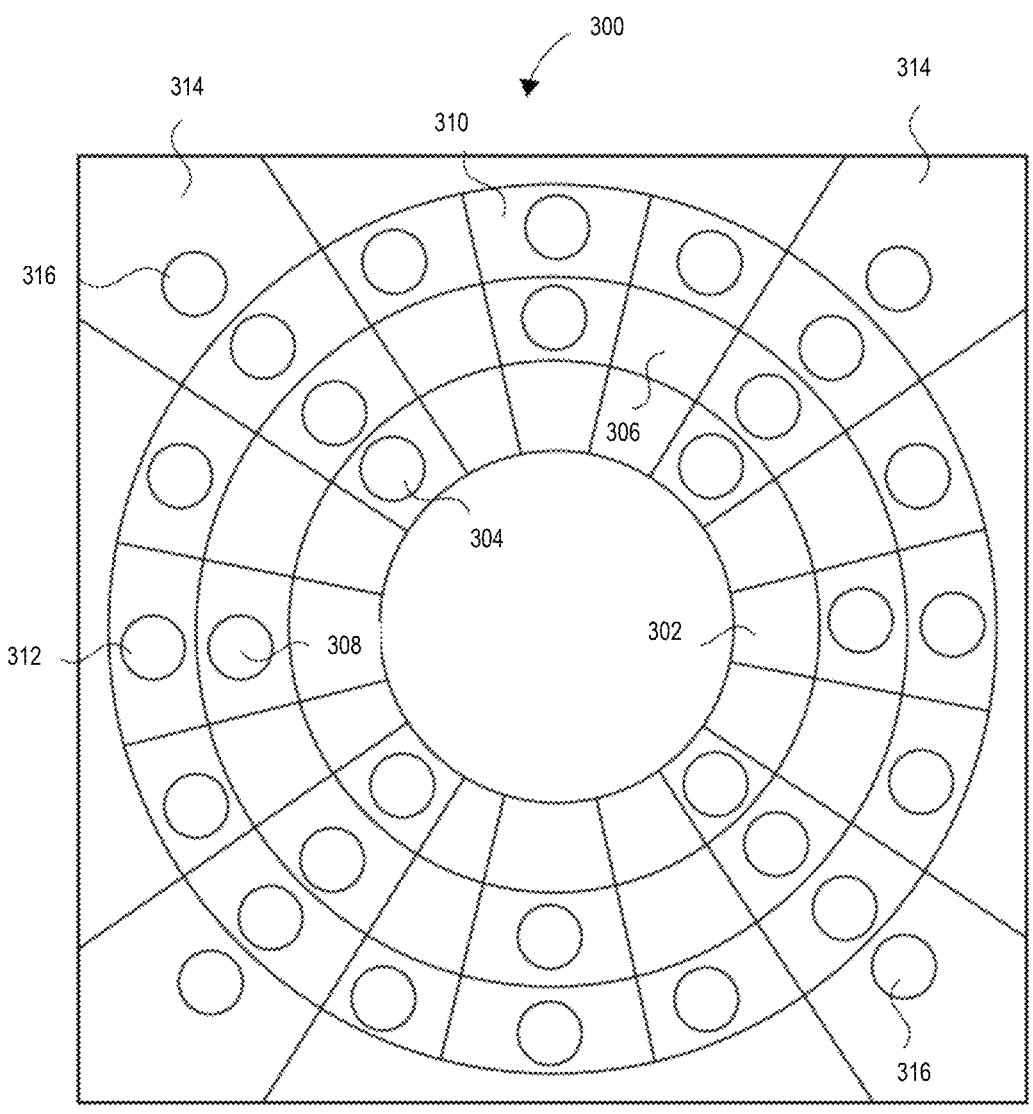
FIG. 3 illustrates the layout of the LEDs of the light dome of FIG. 2, according to some examples.

FIG. 3 illustrates the layout 300 of the LEDs 208 of the light dome 102 of FIG. 2, according to some examples. The LEDs are symmetrically arranged as four inner ring LEDs 304 in an inner ring 302, eight middle ring LEDs 308 in a middle ring 306, and sixteen outer ring LEDs 312 in an outer ring 310. To provide additional light coverage, four corner LEDs 316 are located at corner positions 314.

Figure 4:
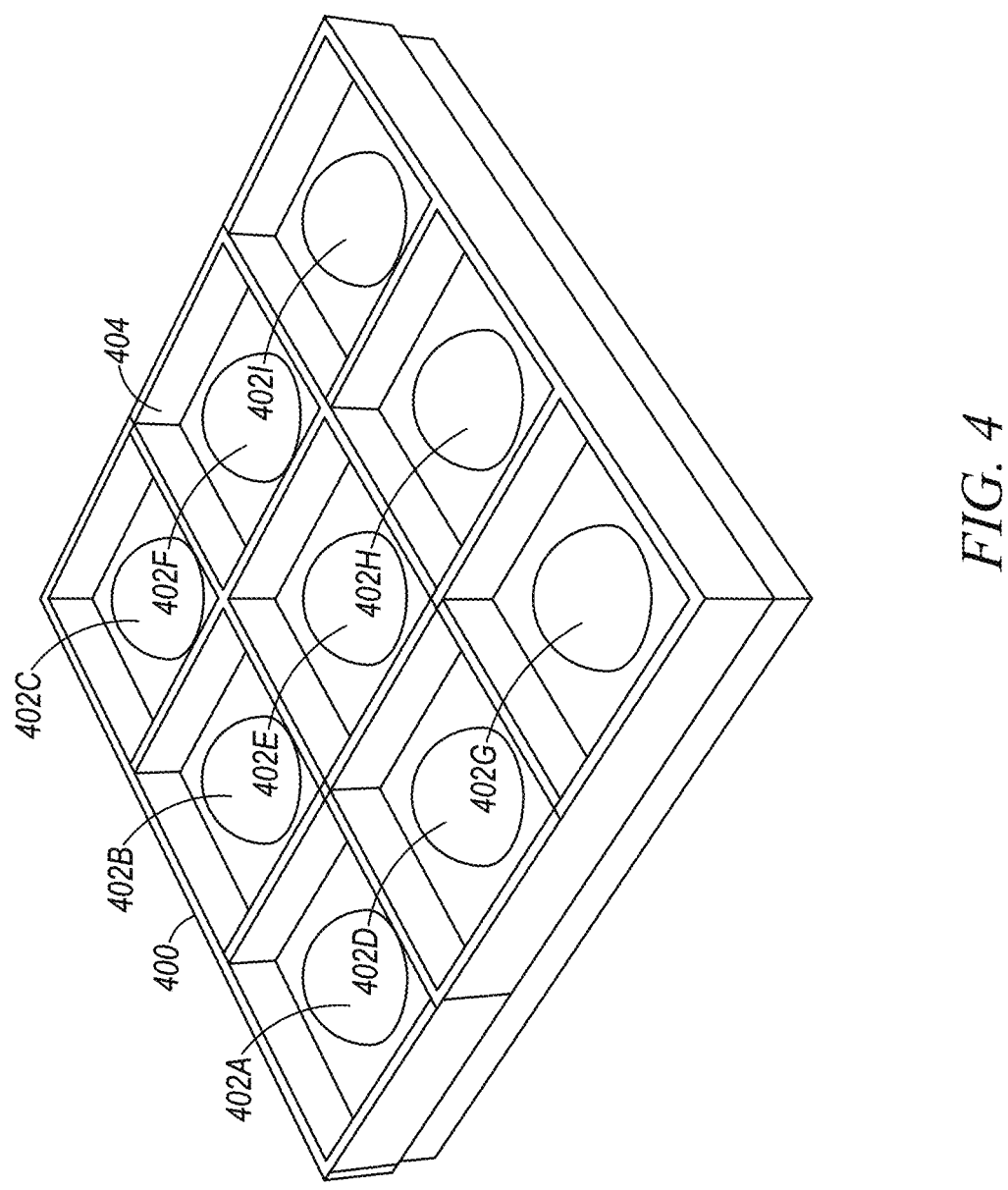
FIG. 4 is a diagram illustrating a calibration object assembly, in accordance with an example embodiment.

FIG. 4 is a diagram illustrating a calibration object assembly 400, in accordance with an example embodiment. Here, the calibration object assembly 400 actually contains within it a plurality of calibration objects 402A-402I. Each of the calibration objects 402A-402I includes a semi-spherical portion that is potentially visible to a camera. These semi-spherical portions are reflective, and may be comprised of any reflective material, such as chrome steel. For ease of construction, in some example embodiments the calibration objects 402A-402I each are spherical in nature when manufactured and are placed in a base having concave portions where the calibration objects 402A-402I may sit in a manner that the semi-spherical portion of the calibration objects 402A-402I depicted in FIG. 4 are visible, or at least potentially visible, based on the camera position. Nevertheless, all that matters is that the potentially visible portion of each of the calibration objects 402I-402I are semi-spherical and reflective. Whatever these calibration objects 402I-402I look like underneath is irrelevant.

Figure 5:
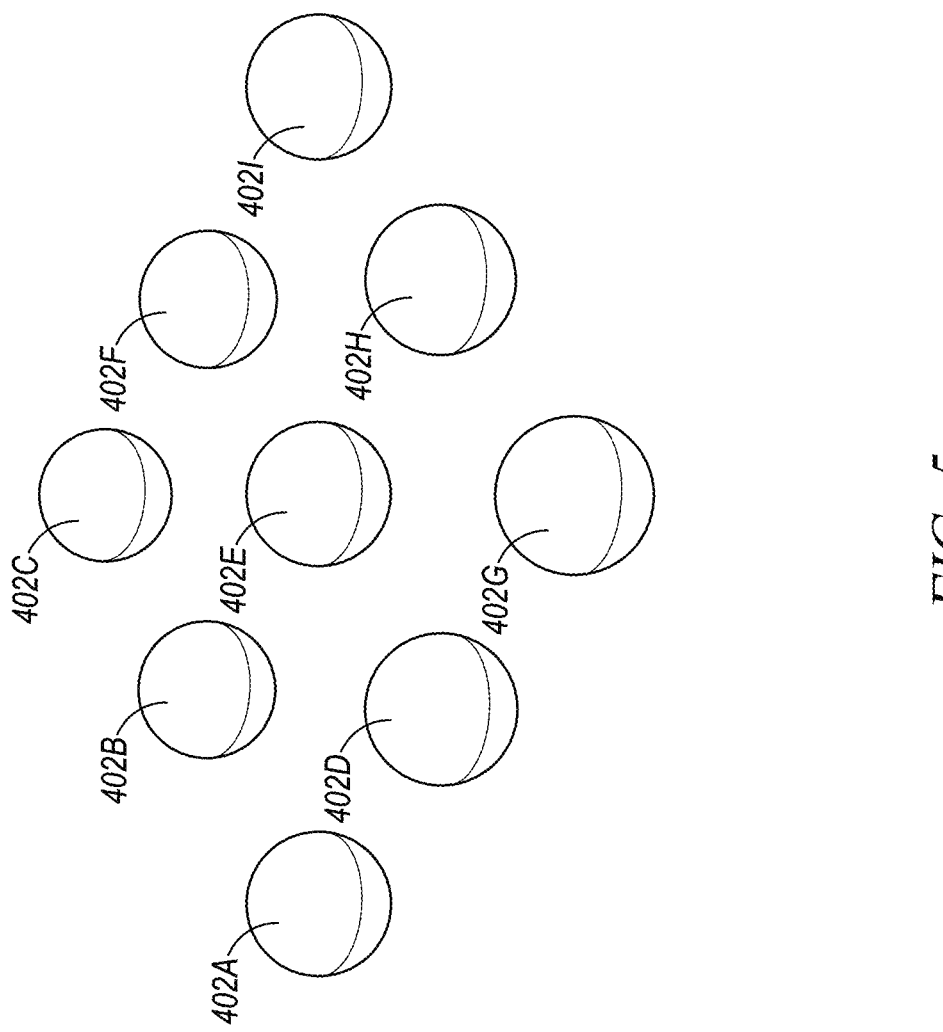
FIG. 5 is a diagram illustrating the plurality of calibration objects they are manufactured, specifically as spherical objects of chrome steel.
Figure 6:
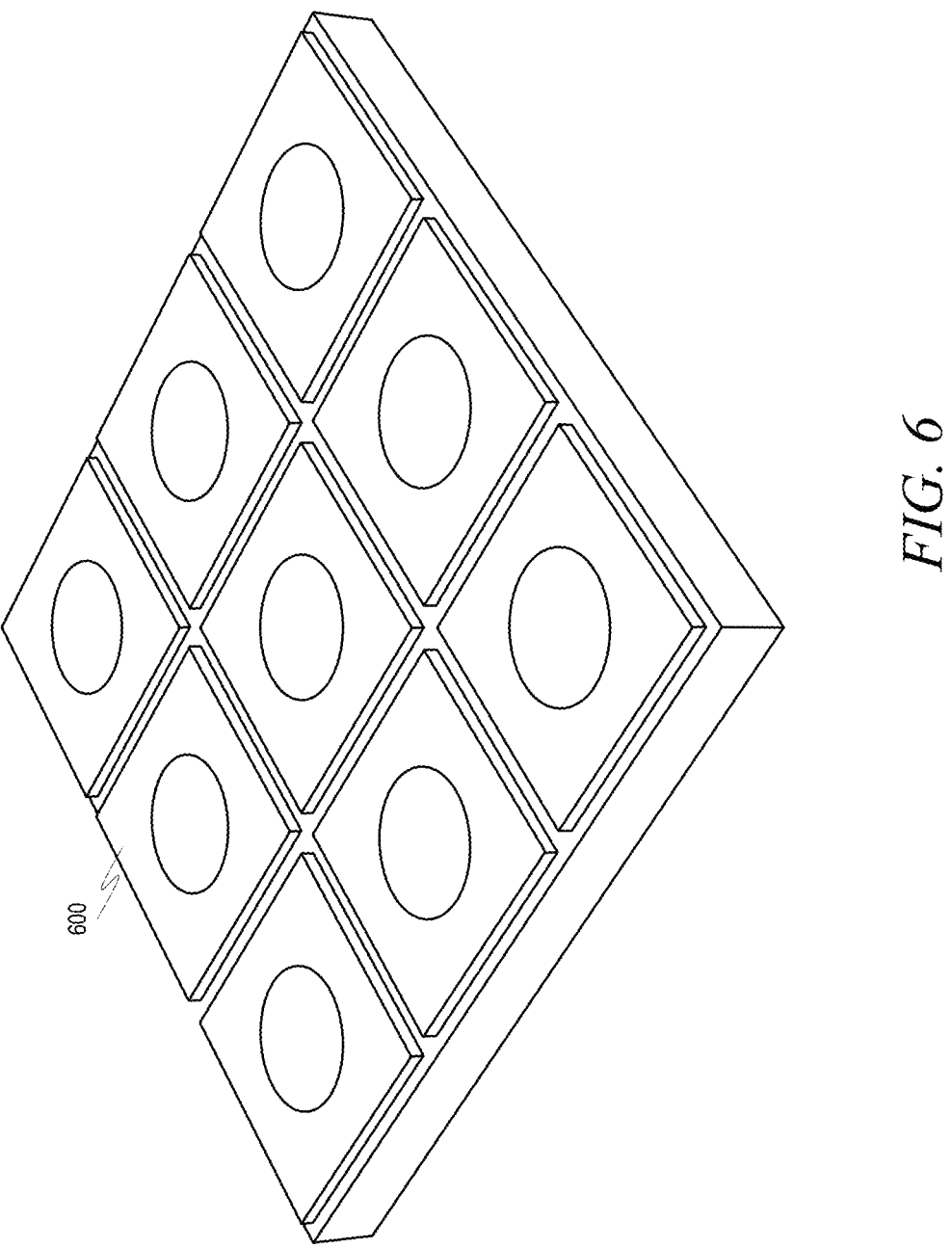
FIG. 6 is a diagram illustrating a base in which the plurality of calibration objects are placed, as part of the construction of the calibration object assembly of FIG. 4.

FIG. 5 is a diagram illustrating the plurality of calibration objects 402A-402I as they are manufactured, specifically as spherical objects of chrome steel. FIG. 6 is a diagram illustrating a base 600 in which the plurality of calibration objects 402A-402I are placed, as part of the construction of the calibration object assembly 402 of FIG. 4.

It should be noted that the terms "spherical" and "semi-spherical" as used within this disclosure shall be interpreted broadly. More specifically, in real-world manufacturing it is impossible for an object to be truly spherical in the mathematical sense as there is always some tolerance needed in the machines used to manufacture the object. As such, the term "spherical" shall be interpreted to cover a shape that is substantially spherical in nature, such as one that is close to spherical but whose difference from a mathematical sphere is insignificant to the calibration process. Likewise, the term "semi-spherical" shall be interpreted to cover a shape that is substantially semispherical in nature, such as one that is close to semi-spherical but whose difference from a mathematical semi-sphere is insignificant to the calibration process.

During the calibration process, the calibration object assembly 400 is placed under the light dome 200 such that the semi-spherical portions of the calibration objects 402A-402I are visible to a camera, such as a camera positioned in the hole of the light dome 200. One or more light sources may then be activated in order to measure the locations at which the one or more light sources cause a reflection, in the plurality of calibration objects 402A-402I. In an example embodiment, each light source may be activated one at a time and the locations that the light source cause a reflection are captured. In this respect, the distance between each individual light source and the camera can be determined. However, it is also possible to have a calibration process where multiple light sources are activated at the same time and the distances determined simultaneously, although this increases the risk of error if, for example, the system cannot tell the difference between a reflection of one light source and a reflection of a second light source in the same calibration objects 402A-402I. This could happen, for example, if the locations of the reflections of the two different light sources are very close to one another. Nevertheless, the decision to utilize a single light source at a time is largely for simplicity, as any technical difficulties in calibration using multiple simultaneous light sources can be worked out.

It should be noted that while there are nine calibration objects 402A-402I depicted in FIG. 4 and FIG. 5, in reality there may be any number of calibration objects 402A-402I. That being said, in an example embodiment there are at least three calibration objects 402A-402I to help ensure reliable distance calculation between the light source and the camera.

Figure 7:
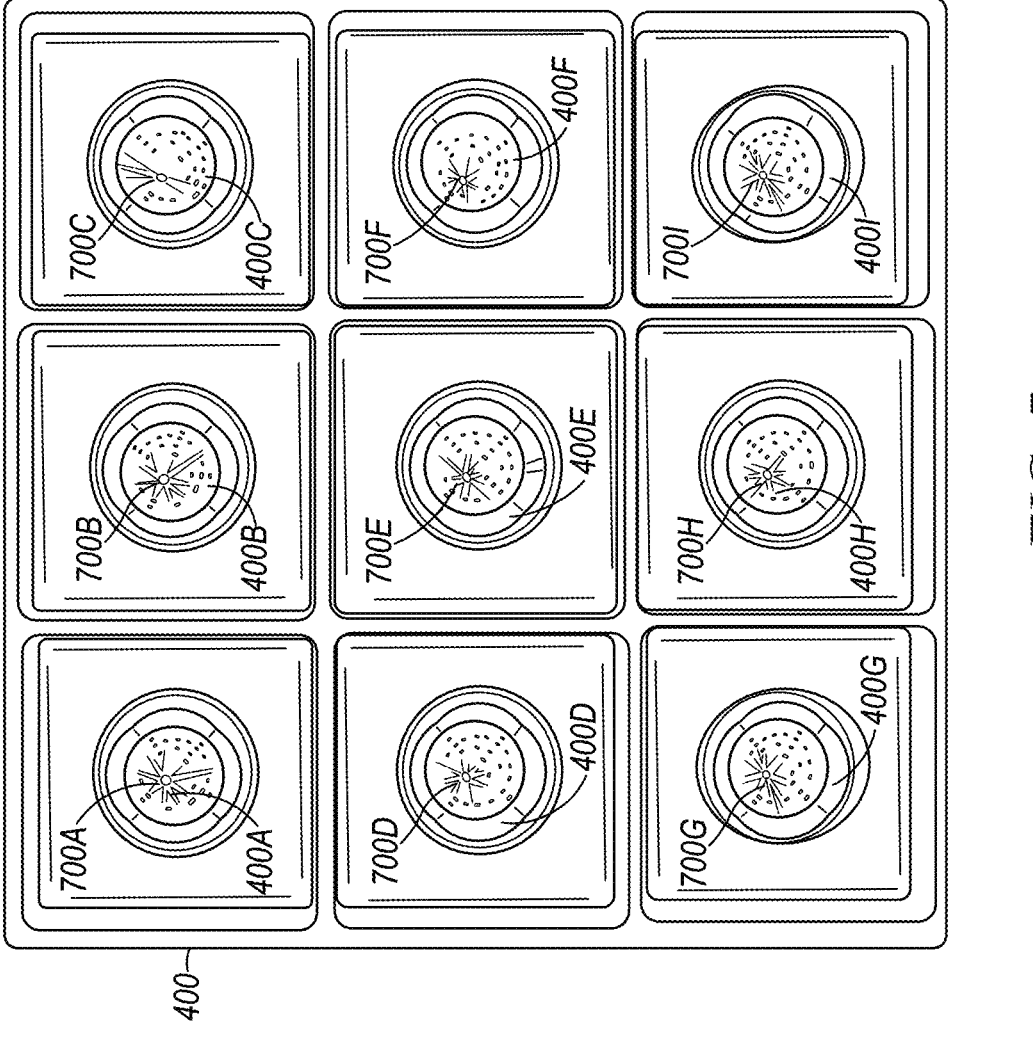
FIG. 7 is a diagram illustrating the calibration object assembly during a calibration process, in accordance with an example embodiment.

FIG. 7 is a diagram illustrating the calibration object assembly 400 during a calibration process. Here, a single light source has been activated, and the view on FIG. 7 is representative of an image taken by the camera whose distance from the light source is to be calculated for calibration purposes. As can be seen, this light source causes a reflection 700A-700I in a different location on each of the plurality of calibration objects 402A-402I. Since the size (e.g., radius) of each of the calibration objects 402A-402I is known, the distance from the top center of each calibration object 402A to the location of the corresponding reflection 700A-700I can be determined from the image. More specifically, since the reflection 700A-700I is on a semi-sphere, the x, y, and z distances from top center can be calculated from the figure. Basically, by knowing the location of the top center and knowing the size (and shape) of the calibration objects 402A-402I, the distances can be determined from the image Knowing the x, y, and z coordinate of each reflection 700A-700I then allows the angle of the incoming light beam to be determined, again based on the semi-spherical shape of the calibration objects 402A-402I.

Using geometry, the angle of this incoming light can then be used to calculate the 3D position of the light source relative to the camera.

It should be noted that the example represented in FIG. 7 is representative of an example where a light shield grid is incorporated into the calibration object assembly 400. More particularly, referring back to FIG. 4, one can see the light shield grid 404, which is constructed as a grid of walls that act to separate the calibration objects 402A-402I from one another. More specifically, one issue that can potentially arise with the use of a plurality of reflective semi-spherical calibration objects 402A-402I is that in some cases, inter-reflections can cause problems during the calibration process. An inter-reflection is a reflection that is from light bouncing off another of the calibration objects 402A-402I rather than coming directly from the light source. The light shield grid 404 acts to block such reflected light from hitting another calibration object 402A-402I.

Figure 8:
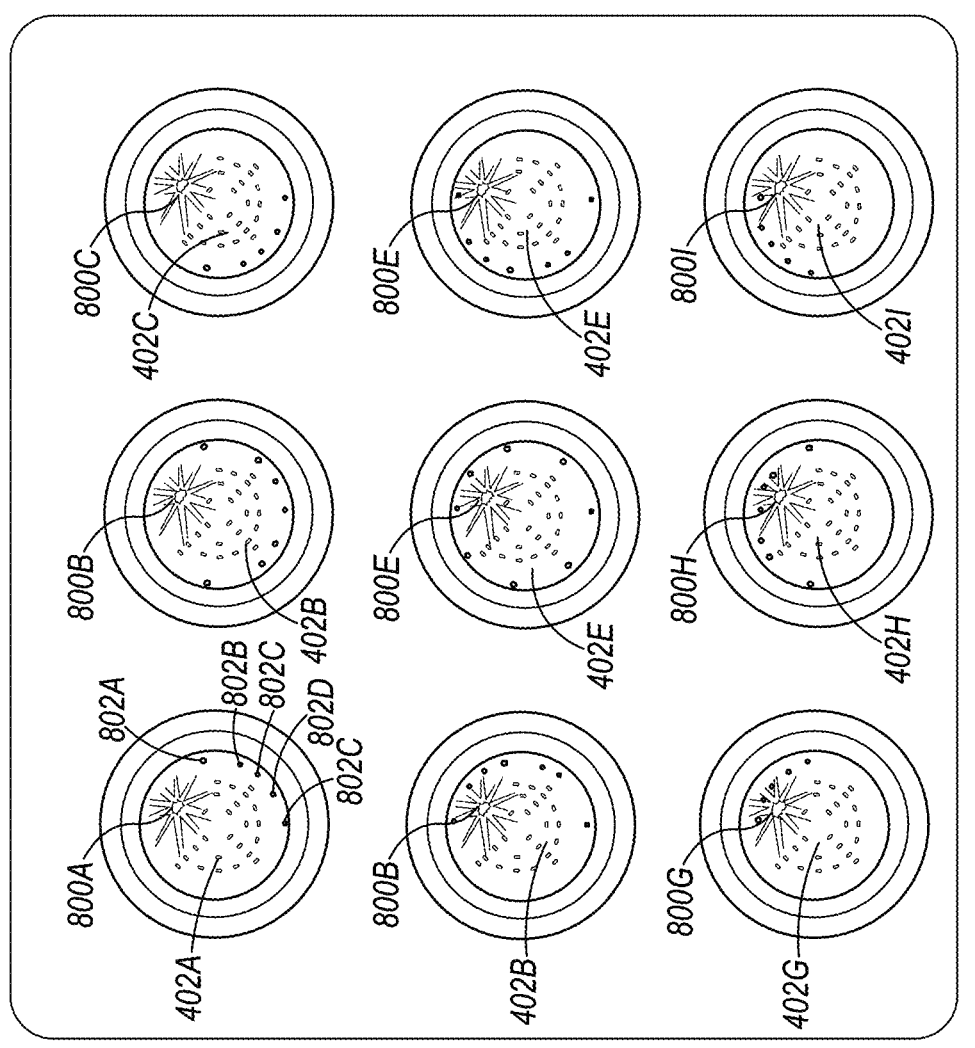
FIG. 8 is a diagram illustrating the calibration object assembly during a calibration process in which no light shield grid was present, in accordance with an example embodiment.

FIG. 8 is a diagram illustrating the calibration object assembly 400 during a calibration process in which no light shield grid 404 was present. Here, as can be seen, in addition to the reflections 800A-800I that appear to come directly from the light source, there are also other reflections, such as reflections 802A-802I of calibration object 404A that appear to be from light that has bounced off from the other calibration objects 400BB-400I. In fact, the size of reflection 802C is relatively close to the size of reflection 802D, such that if they were slightly closer together it could be difficult to differentiate the two, resulting in incorrect measurements and determinations of distances. The light shield grid 404 helps prevent such inter-reflections from occurring.

Referring back to FIG. 4, in an example embodiment, the walls of the light shield grid 404 are substantially equal in height to the height of the calibration objects 402A-402I, at least as measured from a visible plane of the base of calibration object assembly 400. Embodiments are foreseen, however, where the height of the light shield grid 404 is slightly less than the height of the calibration objects 402A-402I.

In an example embodiment, the color of the light shield grid 404 is substantially different from the color of the visible plane of the base 406. This helps the system to differentiate between the light shield grid 404 and the base 406 in images taken by the camera. In an example embodiment, the light shield grid is black and the visible plane of the base 406 is white.

FIG. 9 is a flowchart of an example method 900 for calibrating an inspection system in accordance with an example embodiment.

At operation 910, a first light source of a plurality of independently controllable light sources is activated to shine a light onto each of a plurality of semi-spherical reflective calibration objects on a calibration object assembly from a lighting apparatus.

At operation 920, a camera is used to capture an image of the plurality of semi-spherical calibration objects.

A loop is then repeated for each of the plurality of semi-spherical reflective calibration objects. At operation 930, a reflection of the first light source in a corresponding semi-spherical reflective calibration object in the image is identified.

At operation 940, based on a size of the corresponding semi-spherical reflective calibration object, an angle at which light from the first light source strikes the corresponding semi-spherical reflective calibration object is identified based on a location of the reflection.

At operation 950, it is determined if there are any more semi-spherical reflection calibration objects. If so, then the method 900 loops back to operation 930. If not, then at operation 960, the 3D position of the first light source relative to the camera is calculated using the angle identified for each of the corresponding semi-spherical reflective calibration objects.

Figure 10:
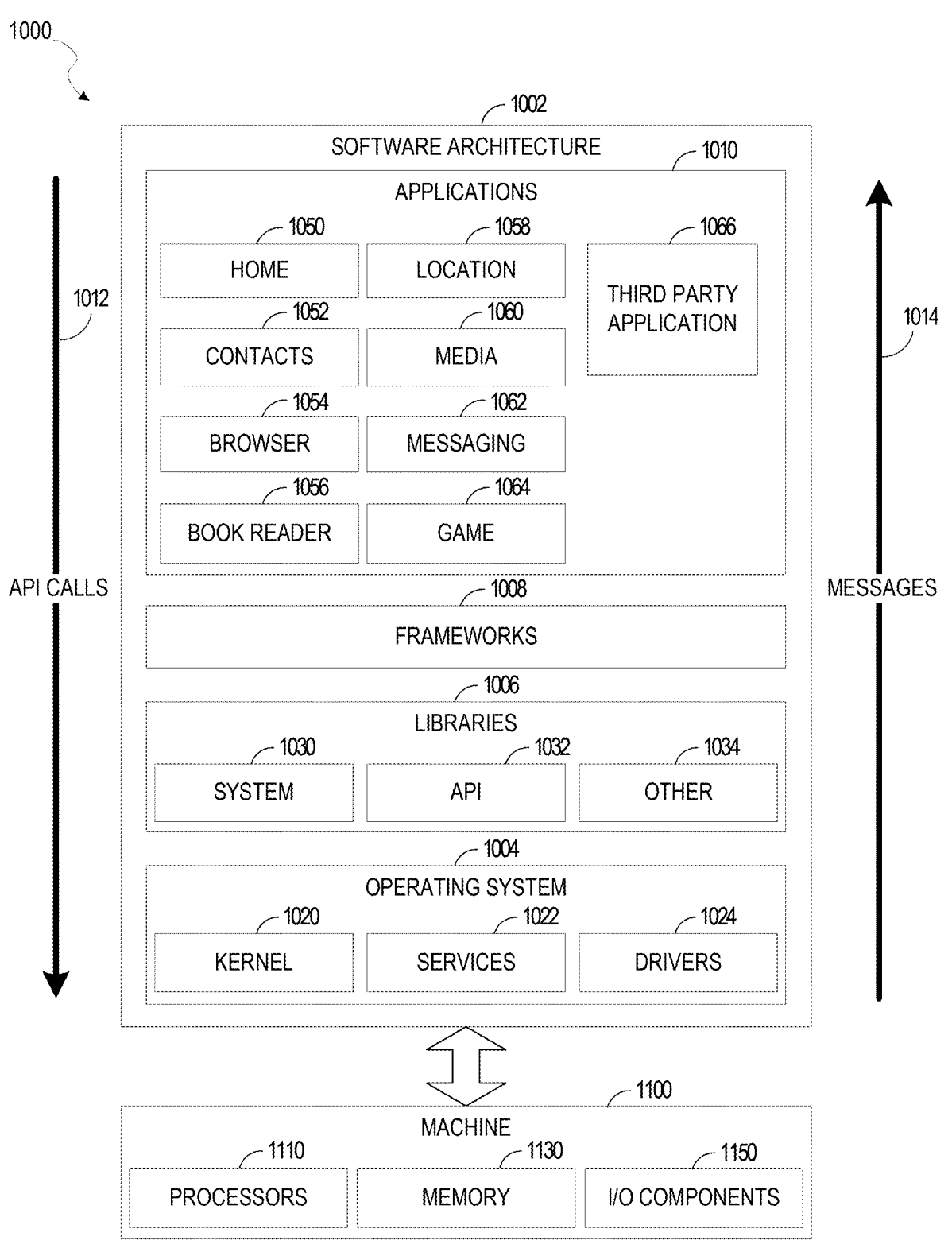
FIG. 10 is a block diagram illustrating a mobile device, according to an example embodiment.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke Application Program Interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010. For example, the frameworks 1008 provide various graphical user interface functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. The applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
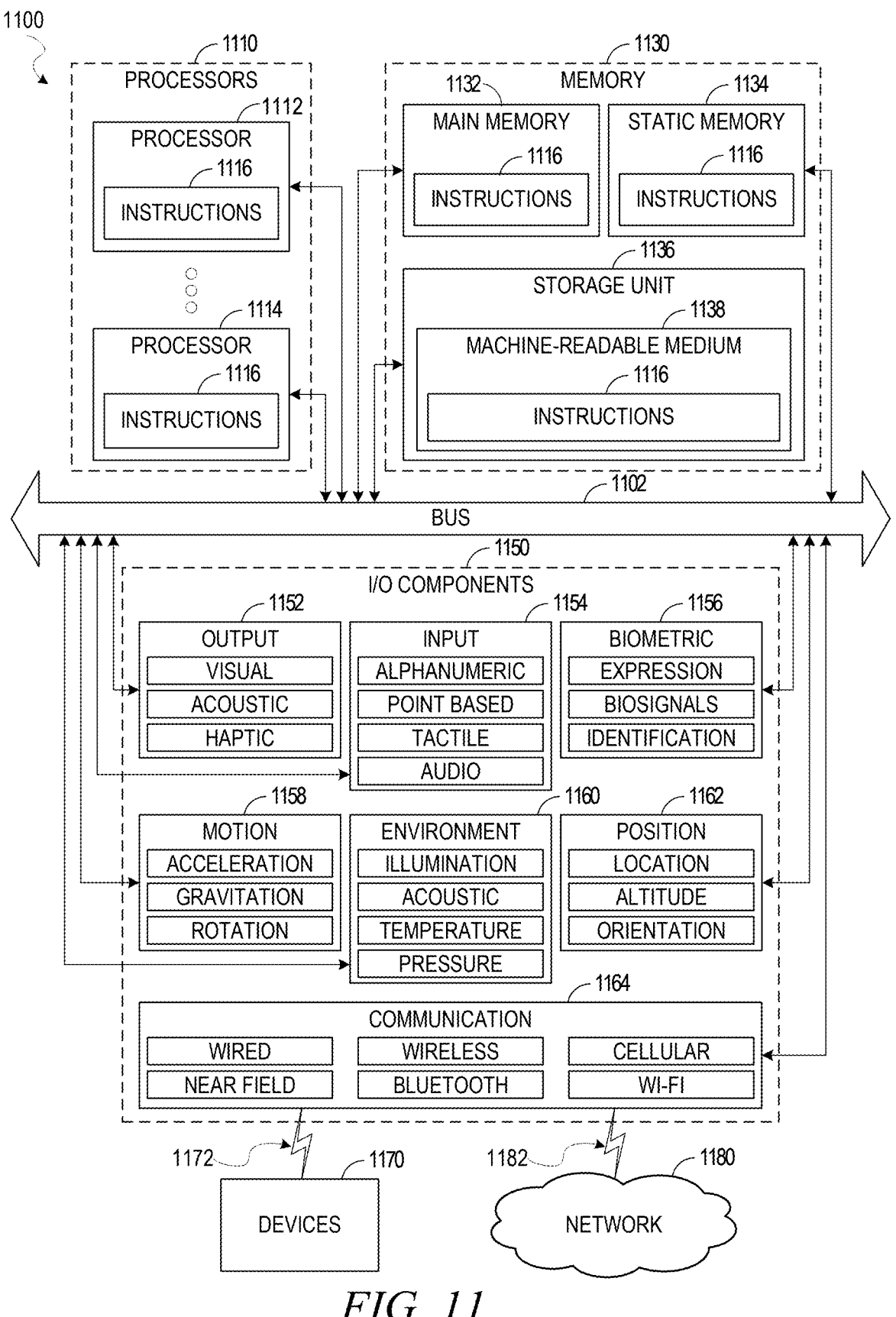
FIG. 11 is a block diagram of machine in the example form of a computer system within which instructions may be executed for causing the machine to perform any one or more of the methodologies discussed herein.

FIG. 11 illustrates a diagrammatic representation of a machine 1100 in the form of a computer system within which a set of instructions may be executed for causing the machine 1100 to perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) cause the machine 1100 to perform any one or more of the methodologies discussed herein to be executed. For example, the instructions 1116 may cause the machine 1100 to execute the method of FIG. 9. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol [HTTP]). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
    a lighting apparatus including a plurality of independently controllable light sources;
    a camera;
    a calibration object assembly including a plurality of semi-spherical reflective calibration objects;
    a computer system comprising at least one hardware processor and a non-transitory computer-readable medium storing instructions that, when executed by the at least one hardware processor, cause the at least one hardware processor to perform operations comprising:
        activating a first light source of the plurality of independently controllable light sources to direct first light onto each of the plurality of semi-spherical reflective calibration objects;
        using the camera to capture an image of the plurality of independently controllable light sources;
        for each of the plurality of semi-spherical reflective calibration objects:
            identifying reflection of the first light from a corresponding semi-spherical reflective calibration object in the image;
            identifying an angle at which the first light from the first light is reflected by the corresponding semi-spherical reflective calibration object based on a location of the reflection in an image taken by the camera and based on a size of the corresponding semi-spherical reflective calibration object; and
        calculating positions, in a three-dimensional space, of the first light source relative to the camera using the angle identified for each of the corresponding semi-spherical reflective calibration objects.

2. The system of claim 1, wherein the calibration object assembly contains a light shield grid, the light shield grid having a plurality of walls, each wall oriented to block reflected light from one of the semi-spherical reflective calibration objects from hitting another of the semi-spherical reflective calibration objects.

3. The system of claim 2, wherein each of the plurality of semi-spherical reflective calibration objects is part of a sphere sitting in a separate concave portion of a base, and wherein the base is a different color than the light shield grid.

4. The system of claim 1, wherein the operations further comprise:
    repeating the operations for each of the plurality of independently controllable light sources, one at a time.

5. The system of claim 1, wherein the lighting apparatus is a light dome oriented with a concave portion of the light dome aimed downwards, with the calibration object assembly located underneath the concave portion of the light dome.

6. The system of claim 1, wherein each of the plurality of semi-spherical reflective calibration objects is part of a sphere sitting in a separate concave portion of a base.

7. The system of claim 6, wherein the sphere is comprised of chrome steel.

8. A method comprising:
    activating a first light source of the plurality of independently controllable light sources to direct first light onto each of the plurality of semi-spherical reflective calibration objects;

using the camera to capture an image of the plurality of independently controllable light sources;

for each of the plurality of semi-spherical reflective calibration objects:

identifying reflection of the first light from a corresponding semi-spherical reflective calibration object in the image;

identifying an angle at which the first light from the first light is reflected by the corresponding semi-spherical reflective calibration object based on a location of the reflection in an image taken by the camera and based on a size of the corresponding semi-spherical reflective calibration object; and calculating positions, in a three-dimensional space, of the first light source relative to the camera using the angle identified for each of the corresponding semi-spherical reflective calibration objects.

9. The method of claim 8, wherein the calibration object assembly contains a light shield grid, the light shield grid having a plurality of walls, each wall oriented to block reflected light from one of the semi-spherical reflective calibration objects from hitting another of the semi-spherical reflective calibration objects.

10. The method of claim 9, wherein each of the plurality of semi-spherical reflective calibration objects is part of a sphere sitting in a separate concave portion of a base, and wherein the base is a different color than the light shield grid.

11. The method of claim 8, further comprising:

repeating the method for each of the plurality of independently controllable light sources, one at a time.

12. The method of claim 8, wherein the lighting apparatus is a light dome oriented with a concave portion of the light dome aimed downwards, with the calibration object assembly located underneath the concave portion of the light dome.

13. The method of claim 8, wherein each of the plurality of semi-spherical reflective calibration objects is part of a sphere sitting in a separate concave portion of a base.

14. The method of claim 13, wherein the sphere is comprised of chrome steel.

15. A non-transitory machine-readable storage medium having embodied thereon instructions executable by one or more machines to perform operations comprising:

activating a first light source of the plurality of independently controllable light sources to direct first light onto each of the plurality of semi-spherical reflective calibration objects;

using the camera to capture an image of the plurality of independently controllable light sources;

for each of the plurality of semi-spherical reflective calibration objects:

identifying reflection of the first light from a corresponding semi-spherical reflective calibration object in the image;

identifying an angle at which the first light from the first light is reflected by the corresponding semi-spherical reflective calibration object based on a location of the reflection in an image taken by the camera and based on a size of the corresponding semi-spherical reflective calibration object; and calculating positions, in a three-dimensional space, of the first light source relative to the camera using the angle identified for each of the corresponding semi-spherical reflective calibration objects.

16. The non-transitory machine-readable storage medium of claim 15, wherein the calibration object assembly contains a light shield grid, the light shield grid having a plurality of walls, each wall oriented to block reflected light from one of the semi-spherical reflective calibration objects from hitting another of the semi-spherical reflective calibration objects.

17. The non-transitory machine-readable storage medium of claim 15, wherein the operations further comprise:

repeating the operations for each of the plurality of independently controllable light sources, one at a time.

18. The non-transitory machine-readable storage medium of claim 15, wherein the lighting apparatus is a light dome oriented with a concave portion of the light dome aimed downwards, with the calibration object assembly located underneath the concave portion of the light dome.

19. The non-transitory machine-readable storage medium of claim 15, wherein each of the plurality of semi-spherical reflective calibration objects is part of a sphere sitting in a separate concave portion of a base.

20. The non-transitory machine-readable storage medium of claim 19, wherein the sphere is comprised of chrome steel.

* * * * *